Oct. 14, 1958    D. L. MOUNT    2,855,788
AUTOMATIC MULTIPLE SPEED TRANSMISSION
Filed Aug. 10, 1956    3 Sheets-Sheet 2
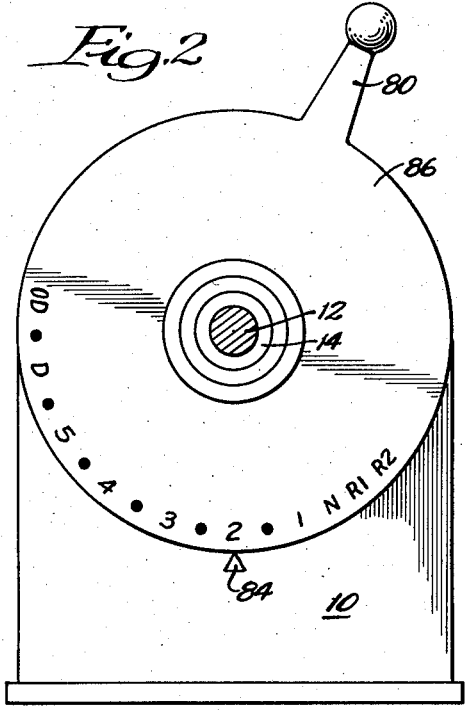
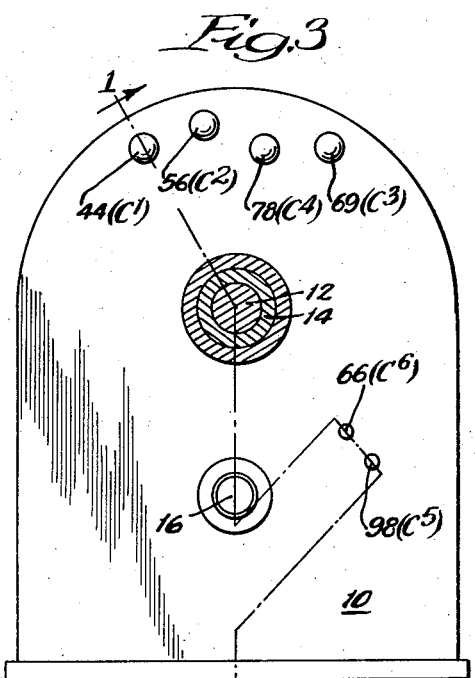
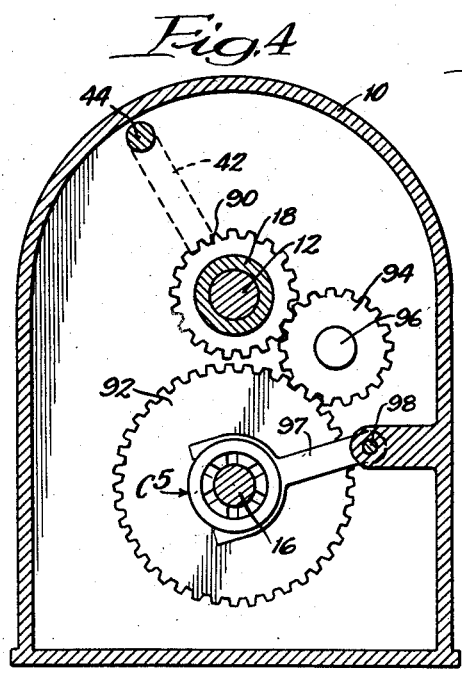
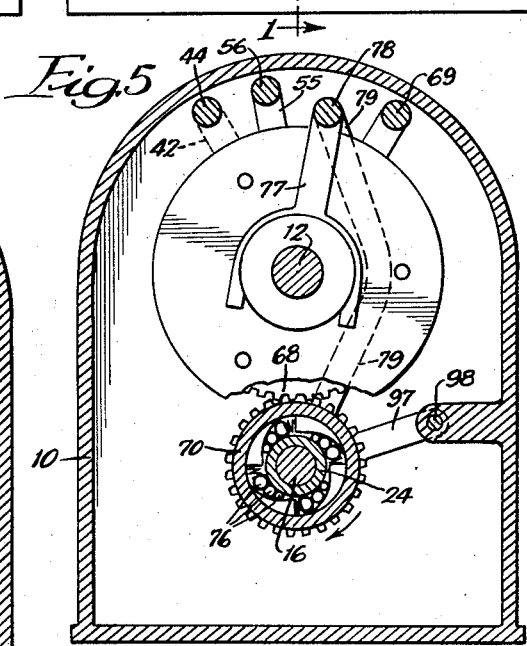
INVENTOR:
Donald L. Mount,
BY
Bair, Freeman & Molinare
ATTORNEYS.

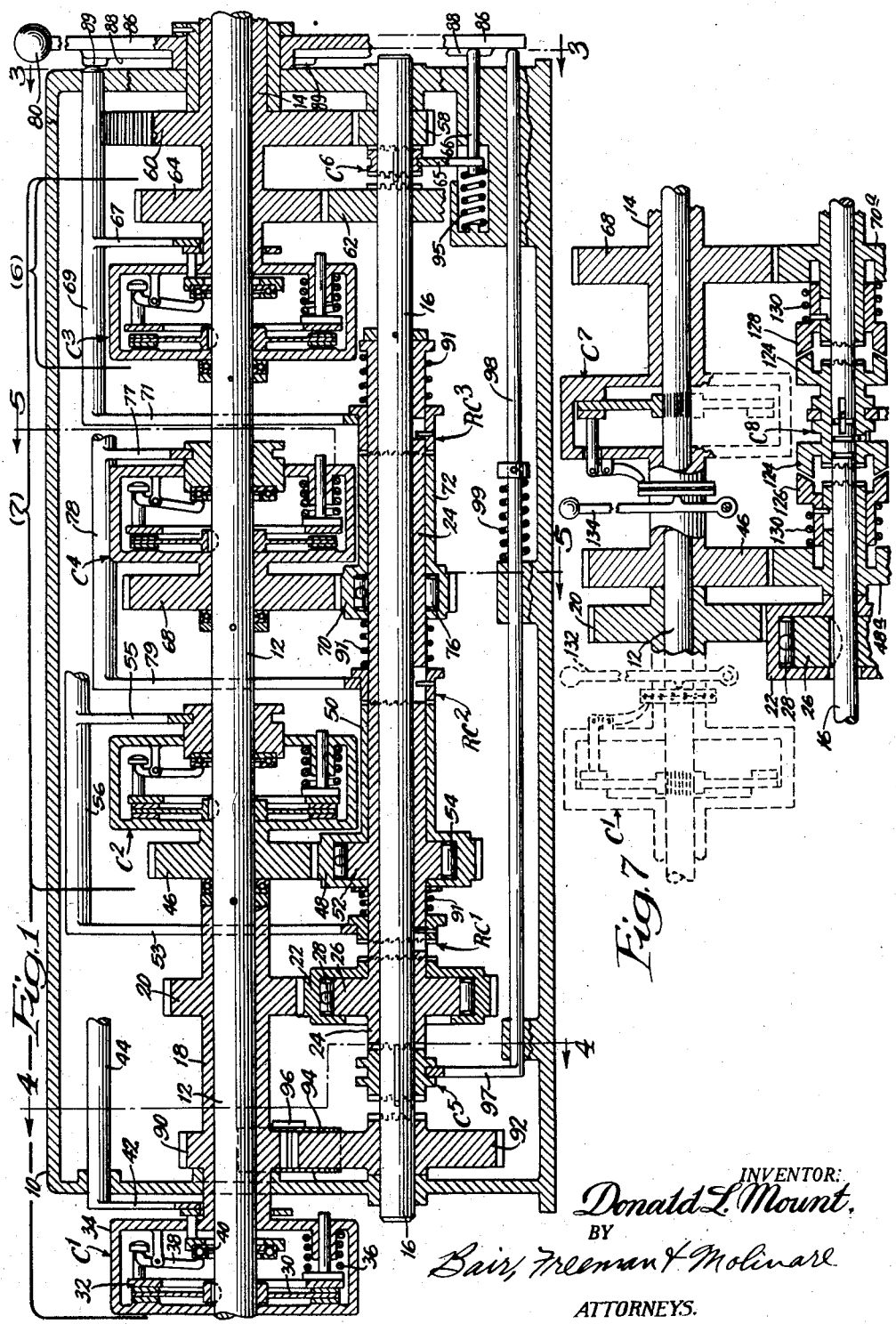

Oct. 14, 1958 D. L. MOUNT 2,855,788
AUTOMATIC MULTIPLE SPEED TRANSMISSION
Filed Aug. 10, 1956 3 Sheets-Sheet 3
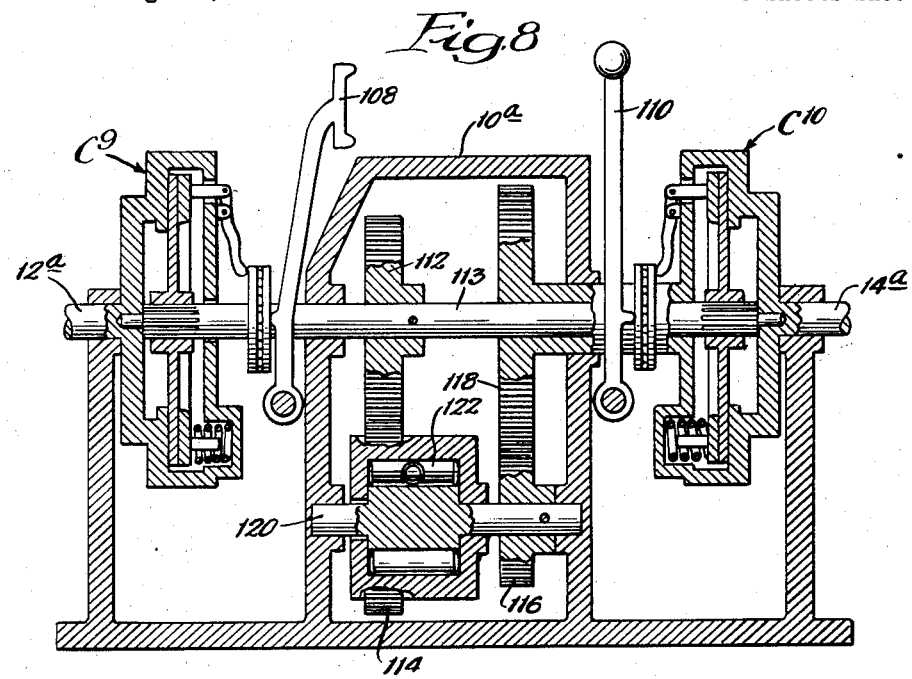
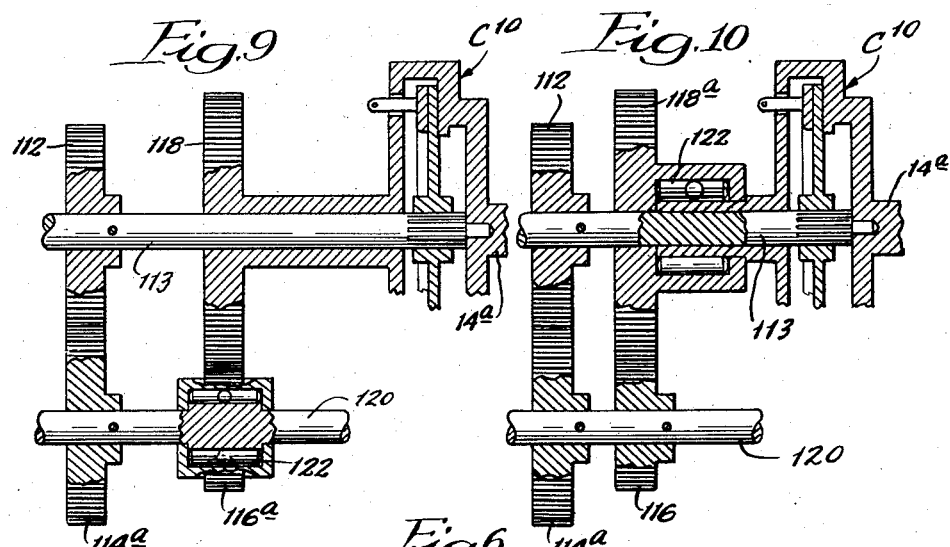
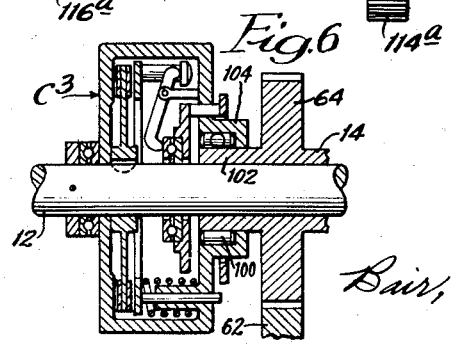
INVENTOR:
Donald L. Mount,
BY
Bair, Freeman & Molinare
ATTORNEYS.

United States Patent Office 2,855,788
Patented Oct. 14, 1958

2,855,788

AUTOMATIC MULTIPLE SPEED TRANSMISSION

Donald L. Mount, Memphis, Mo.

Application August 10, 1956, Serial No. 604,586

16 Claims. (Cl. 74—368)

This invention relates to an automatic multiple speed transmission designed particularly for economical manufacture and having the advantage of a great number of speed changes without declutching between changes. The transmission is particularly adaptable for tractors, automobiles and other machinery where shifting up and down in the forward speed range is desired without declutching between the different speed settings, thereby avoiding the loss of engine power to the traction wheels or other point where the power is utilized. Especially in tractor use, it is usually desirable to change speed while in motion, and with power tools attached to the tractor loss of momentum caused by declutching between gear shifts sometimes results in stopping of the tractor.

One object of my present invention therefore is to provide a multiple speed transmission in which there is a clutch for each speed range, and in going from one speed range to a higher one declutching of the lower speed gears is not necessary due to an overrun clutch connection between the lower speed gears and the output shaft of the transmission. Similarly there are overrun connections between all other gears and the output shaft where required to permit a higher speed clutch to take over and operate the tractor or the like at the higher speed without first declutching the lower speed gear.

Another object is to provide a power transmission in which various gears thereof remain in mesh, and clutches remain engaged in such manner that shift from one gear arrangement to a higher one is accomplished while the power is constantly connected through the transmission to the driven shaft without the necessity of having to throw out an engine clutch between gear shifts, and likewise in down-shifting there is no declutching when shifting from any gear to a lower gear.

Still another object is to provide a transmission with a gearing arrangement that permits operation in different ranges so that the number of gear changes may be doubled by a simple set of gears that shift from one range to the other. For instance, if the transmission is designed for four speeds, a gear shift from one range to the other can increase the number of speeds to eight except where one of the speeds is direct drive which would be operable in either range thus reducing the number of speed shifts to seven.

A further object is to provide a transmission which has as one of its speeds an overdrive operable so that overdrive in relation to direct drive is had in one of the ranges but a different and lower gear in relation to direct drive is had in the other range, thus permitting a relatively great total range from the lowest speed to overdrive with relatively small speed change steps.

Still a further object is to provide a convenient control means for securing the various speeds both forward and reverse, two speeds in reverse being had by reason of the two ranges of the transmission without undue complication of the reverse gearing.

An additional object is to provide free-wheeling or coasting prevention clutches as part of my transmission and a selective control therefore to render them operable or inoperable as desired so that the transmission can be thus operated with or without the free-wheeling prevention feature.

Another additional object is to provide simplified and/or modified forms of my transmission utilizing some or all of its features but with fewer speed changes possible.

With these and other objects in view, my invention consists in the construction, arrangement and combination of the various parts of my automatic multiple speed transmission, whereby the objects above contemplated are attained, as hereinafter more fully set forth, pointed out in my claims and illustrated in detail on the accompanying drawings, wherein:

Fig. 1 is a vertical sectional view through an automatic multiple speed transmission embodying my present invention;

Fig. 2 is an end elevation thereof showing a control handle and indicating dial arrangement;

Fig. 3 is a vertical sectional view on the line 3—3 of Fig. 1 showing friction and overrun clutch operating details, Fig. 1 being taken on the line 1—1 of Fig. 3;

Fig. 4 is a vertical sectional view on the line 4—4 of Fig. 1 showing particularly a reversing gear and a clutch therefor;

Fig. 5 is a vertical sectional view on the line 5—5 of Fig. 1;

Fig. 6 is a vertical sectional view similar to the bracketed portion of Fig. 1 which is indicated (6) and shows modified details substituted for the bracketed portion;

Fig. 7 is another modification of the bracketed portion of Fig. 1 indicated (7) and shows modified details substituted for the bracketed portion;

Fig. 8 is a vertical sectional view through still another modified form of my transmission showing a comparatively simple form having low and direct drive only; and Figs. 9 and 10 are similar views of modified portions of Fig. 8 showing different positions possible for an overrunning clutch thereof.

On the accompanying drawings I have used the reference numeral 10 to indicate a housing for various gears and other mechanisms of my transmission. An input shaft 12 is provided to the left end of which the engine or other source of power is operatively connected, and at the right end of the housing there is an output shaft 14 in the form of a sleeve around the shaft 12. This sleeve is, of course, connected to traction wheels or the like in the usual manner. A countershaft 16 is also journalled in the housing 10.

I provide a low gear sleeve 18 rotatable on the input shaft 12 and operatively connectible with it by a clutch C1 which in Fig. 1 is shown in the engaged or "in" position. A low primary gear 20 is secured thereto and meshes with a low secondary gear 22 rotatable on a sleeve 24 which in turn is rotatable on the countershaft 16. The sleeve 24 has a low gear flange 26 forming part of an overrun clutch, the overrun rollers of which are shown at 28. A similar overrun clutch with overdrive secondary gear 70 and overrun rollers 76 is shown in Fig. 5, to which reference is made for the details of the overrun clutch 22—26—28 and others to be desecribed. In Fig. 5, however, there is no flange as the overrun rollers engage the sleeve 24 directly.

Details of the clutch C1 will now be described. This clutch consists of an input friction disc 30 splined to the shaft 12, a floating output disc 32, clutch springs 36 to normally engage the clutch, pivoted clutch levers 38 to disengage the clutch and carried by a clutch housing 34 constituting also an output disc, and a thrust bearing 40 engaging the clutch levers and adapted to be actuated by a clutch actuating arm 42 for disengaging the clutch, A clutch actuating rod 44 carries the clutch actuating arm 42 and is slidable in the housing 10, its end extending out of the right-hand end of the housing for actuation by a clutch control lever 80 through cam mechanism as will be later described. The springs 36 normally bias the clutch to the "in" position and the rod 44 toward the lever 80.

Freely rotatable on the input shaft 12 is a middle primary gear 46 meshing with a middle secondary gear 48 on a sleeve 50 which is rotatable on the sleeve 24. The sleeve 24 has a middle gear flange 52 forming part of an overrun clutch in relation to the middle secondary gear 48 which clutch includes overrun rollers 54. The middle primary gear 46 is adapted to be operatively connected with the input shaft 12 by a clutch C2, the construction of which is similar to the clutch C1 and therefore I have omitted reference numerals and will not repeat the description. Likewise I have omitted reference numbers on other clutches C3, C4 and C7 of similar construction. The clutch C2 has a clutch actuating arm 55 extending from a clutch actuating rod 56 which likewise extends out of the right-hand end of the housing 10 in a manner similar to the rod 44.

There is a first range gear connection between the countershaft 16 and the output sleeve 14 comprising a primary gear 58 and a secondary gear 60. There is also a second range gear connection between these two shafts comprising a primary gear 62 and secondary gear 64. The first range gears are lower ratio than the second range gears. A clutch C6 is provided for selectively clutching either 58 or 62 to the countershaft 16 and the clutch is actuated by a clutch actuating arm 65 connected with a clutch actuating rod 66 which also extends out of the right-hand end of the housing 10.

A clutch C3 similar to the clutches C1 and C2 is provided as a direct connection between the input shaft 12 and the output sleeve 14 and when this clutch is engaged direct drive is had which I refer to as "D" in a chart later on in my specification. This is direct drive as distinguished from low gear and middle gear indicated in said chart as "LO" and "MID" respectively. There is also a higher gear than "D" which I designate "OD" for overdrive. For operating the clutch C3, a clutch actuating rod 69 has a clutch actuating arm 67 and the rod extends out of the right-hand end of the housing 10.

My overdrive gear arrangement comprises an overdrive primary gear 68 meshing with an overdrive secondary gear 70 on a sleeve 72 rotatable on the sleeve 24.

In the overdrive gear arrangement, overrun rollers 76 coact directly with the sleeve 24 to constitute with the overdrive secondary gear 70, an overrun clutch drive from the shaft 12 to the sleeve 24. A clutch actuating arm 77 is provided for the clutch C4 and a clutch actuating rod 78 therefor extends out of the right-hand end of the housing 10.

The reverse gearing for my transmission includes a reverse primary gear 90, a reverse secondary gear 92 and a reverse idler gear 94. The arrangement is best shown in Fig. 4. The idler 94 rotates on a stud 96 extending from the housing 10.

Mounted on the countershaft 16 between the low gear flange 26 and the reverse secondary gear 92 is a clutch C5. A clutch actuating arm 97 is provided therefor and is mounted on a clutch actuating rod 98 extending out of the right-hand end of the housing 10. The extending rod ends 44, 56, 78 and 69 are shown in Figure 3 adjacent the top of the housing 10 and the rod ends 66 and 98 to the right of the shaft 16, and the clutches they operate are indicated.

For actuating the clutch rods 44, 56, 66, 69, 78 and 98, I provide a clutch control lever 80 having a cam plate 86 with appropriate lobes 88 to depress the ends of the clutch actuating rods against the bias of springs in a predetermined pattern as will be referred to in a chart hereinbelow. The springs just referred to are the clutch springs 36 for each of the clutches C1, C2, C3 and C4, and springs 95 and 99 for the rods 66 and 98 respectively. Indicia is provided on the outside of the cam plate 86 as shown in Fig. 2 to cooperate with an index 84 to indicate the different speed shifts of the transmission. The indicia may be identified as follows, reading counterclockwise around the dial:

OD—Overdrive
D—Direct drive
5, 4, 3, 2, 1—Progressively lower speed ranges (5 in all)

The following are all reverse as distinguished from forward:

N—Neutral
R1—Reverse in range 1
R2—Reverse in range 2

The chart referred to above is as follows:

| Dial | Gear | Range | Ratio | C E | C1 | C2 | C3 | C4 | C5 | C6 (Gears) |
|------|------|-------|-------|-----|------|------|------|------|----|----------|
| OD   | OD (68–70) | R2 | (135) | C4 | In | In | Out | In | F | 62–64 |
| D    | (Direct) | R2 | (100) | C3 | In | In | In | Out | F | 62–64 |
| 5    | MID (46–48) | R2 | (67) | C2 | In | Out | Out | Out | F | 62–64 |
| 4    | OD (68–70) | R1 | (54) | C4 | In | In | In | In | F | 58–60 |
| 3    | LO (20–22) | R2 | (45) | C1 | In | Out | Out | Out | F | 62–64 |
| 2    | MID (46–48) (Figs. 1 and 2) | R1 | (27) | C2 | In | In | Out | Out | F | 58–60 |
| 1    | LO (20–22) | R1 | (18) | C1 | In | Out | Out | Out | F | 58–60 |
| N    | None | R1 | 0 | None | Out | Out | Out | Out | N | 58–60 |
| R1   | R-R1 (90–94–92) | R1 | (13R) | C1 | In | Out | Out | Out | R | 58–60 |
| R2   | R-R2 (90–94–92) | R2 | (33R) | C1 | In | Out | Out | Out | R | 62–64 |

In the above chart the column headings may be identified as follows:

Dial—The indicia reading on the cam plate 86 (Fig. 2).
Gear—The gear ranges already referred to with R—R1 being reverse in range 1 and R—R2 being reverse in range 2.
Range—Range 1 and range 2 are indicated for gear sets 58—60 and 62—64 respectively as designated under C6.
Ratio—This is the approximate actual speed ratio as between the input shaft 12 and the output shaft 14—(135) being a ratio of 135 to 100 etc. and (13R) being a ratio of 13 to 100 in reverse, etc.
C E—The particular "clutch engaged" when operating in forward speed. This involves clutches C1, C2, C3 and C4, none of which are engaged in neutral (N). In reverse, C5 is shifted from the position shown in Fig. 1 to the reverse position in engagement with gear 92 instead of gear 26 and the clutch C1 is then the controlling clutch.

C1 to C6 are the six clutches already described, and under C1 to C4 they are designated either "In" or "Out" depending on whether they are in engagement or disengaged. Under C5, forward, neutral and reverse positions are indicated F, N and R, respectively. The clutch C6 is either in the first range or the second range, and gears involved are indicated.

The positions of the clutches C1 to C6 in the above chart are secured by the proper positioning of the cam lobes 88 coacting with the clutch rods 44, 56, 66, 69, 78 and 98 shown in Fig. 3. Different arrangements, of course, can be provided but it is desirable to have a progressive speed change such as from a ratio of 18 to a ratio of 135 in the forward range (as in the "ratio" column of the above chart) on one side of neutral (N), and a ratio of 13 and then 33 in reverse on the other side of neutral.

Figs. 1 and 2 show the parts of the transmission in middle speed and first range position with a consequent set of conditions existing in the sixth horizontal column (underlined) of the above chart.

The operation of my transmission is such that (considering the seven speeds 1, 2, 3, 4, 5, D and OD under "Dial" of the above chart) when speed 1 is in effect and C1 only is closed, the drive is from 12 through the elements 18, 20, 22, 28, 26, C5, 16, 58 and 60 to 14. When speed 2 is in effect, C2 is also closed and the drive is from 12 through C2, 46, 48, 54, 52, 24, 16, 58 and 60 to 14, 22—26—28 overrunning because 46—48 is a higher ratio than 20—22. Likewise, when C3 is closed for speed D, direct drive is had from 12 through C3 to 14 and the gears 46—48 are overrun so that both of the overrun clutches 22—26—28 and 48—52—54 overrun.

At speeds 3 and 5, the difference from speeds 1 and 2 are merely in the range—range 2 being used instead of range 1. At speed 4, the overdrive gears 68 and 70 and the overdrive clutch 24—70—76 are involved so that drive from 12 is through C4, 68, 70, 76, 24, 16, 58 and 60 to 14. Even though the overdrive gear is in operation the ratio is less than (100) (direct drive D) because of the low gear ratio between 58 and 60 at speed OD, range 2 is involved (gears 62 and 64 instead of 58 and 60).

In each of the progressively higher speeds from speed 1 to speed D, one, two or three of the overrun clutches overruns so that in speed 2 for instance the ratio (27), see chart above, takes over from the ratio (18) without any loss of power and likewise the gears involved in each higher ratio merely overrun the previous gears so that there is no loss of traction from neutral through speed D. In overdrive, however, due to the ratio of range 2 gears 62—64 being less than the ratio of overdrive gears 68—70, it is necessary to throw clutch C3 "out" when clutch C4 is thrown "in" and the clutch rod 78 therefore is out of circumferential alignment with the clutch rods 44, 56 and 69 so that proper lobes 88 of the cam plate 86 may be provided to accomplish this. In the speed 4 position, C3 does not need to be "out" when C4 is "in" because gears 68—70 do not overrun range 1 gears 58—60.

The change from speed D to speed OD can be performed rapidly before momentum is lost in speed D but in any case if it is lost, then the speed can drop no lower than speed 5 because clutch C2 is "in" when the clutch control lever 80 is in the speed OD position. In reducing speeds, likewise there is no loss of power between one speed and another as for instance, from speed D to speed 5, because clutch C2 is "in" and ready to take over as soon as clutch C3 is thrown "out." Thus there is a smooth application of power from the engine to the traction wheels both in up-shifting and down-shifting of the transmission.

Neutral (N) is had by throwing clutches C1, C2, C3 and C4 "out" and moving the clutch C5 to neutral (a centered position between clutching with the gear 26 and clutching with the gear 92). When C5 is clutched with 92, then of course I have reverse, and in two different ranges by selecting the gears 58—60 or 62—64 (with C1 operable as the controlling clutch in this case). The cam lobes 88 can be readily designed to secure the desired control pattern in accordance with the above chart.

The overrun clutches will permit "free wheeling" when the output shaft 11 rotates faster than it is normally driven by the output gearing from the shaft 12 except in the case of direct drive (speed D) as when the vehicle is "coasting." Sometimes it is undesirable, however, to permit free-wheeling and accordingly I provide a means to prevent such in the form of ratchet clutches RC1, RC2 and RC3. RC1 is so linked up with C2 that when C2 is "out," RC1 is "in" and vice versa. Similarly, RC2 and RC3 are linked up with the clutches C4 and C3 respectively. The heights of the lobes 88 for the clutch rods 56, 78 and 69 are such that they do not permit RC1, RC2 and RC3 to engage, but higher lobes do permit such engagement. These higher lobes are indicated 89 on the drawing (Fig. 1).

The plate 86 between the different speeds forward has large dots which indicate for instance, speed 1 with RC1 engaged so that the speeds 1, 2, 3, etc. are without free wheeling as afforded by operation of the ratchet clutches RC1, RC2 and RC3. The dot between 1 and 2 indicates a position where the speed is 1 but free wheeling is permitted because the ratchet clutches RC1, RC2 and RC3 are all disengaged. The ratchet clutches are such that they prevent rotation in one direction and this is the direction that the traction wheels would drive the countershaft 16 in the event of coasting so that coasting is prevented when the clutches are in operation.

The ratchet clutches RC1, RC2 and RC3 are provided with springs 91 for normally engaging them and are held out of engagement by arms 53, 79 and 71 extending from the clutch actuating rods 56, 78, and 69 for the respective ratchet clutches RC1, RC2 and RC3. The springs 91, however, are much weaker than the main clutch springs 36 of the clutches C2, C4 and C3.

The ratchet clutch arrangement disclosed as tied in with the other clutches provides for disengagement of RC1 etc. for instance before C2 closes while C1 stays closed normally when shifting from speed 1 to speed 2. The cam plate 86 when half way between speed 1 and speed 2 disengages all three ratchet clutches so that free wheeling is permitted and likewise at the dots between the other speeds from 2 to OD. By tying RC1 in with the operation of C2 and likewise RC2 and RC3 in with C4 and C3 respectively, the low, direct and overdrive gears produce a progressive throwout of the ratchet clutches to accomplish the desired results.

In Fig. 6 I show a modification wherein the clutch C3 is connected with the output shaft 14 by an overrun clutch comprising overrun rollers 100 between a hub 102 of the shaft 14 and an extension sleeve 104 of the clutch C3 rather than the direct or solid connection between C3 and 14 as in Fig. 1. This allows for a straight-through progressive change of speed up and down without the possibility of losing torque between speed D and speed OD when shifting into overdrive. In that case the speed OD in the above chart may be modified to the extent that the clutch C3 is "in" rather than "out" thus making the cam lobing 88 somewhat simpler in construction.

In Fig. 7 I have shown a modification of Fig. 1 wherein a single clutch C7 is provided to take the place of clutches C2, C3 and C4. The clutch C7 is connected with the gears 46 and 68 of Fig. 1 whereas the gears 48 and 70 of Fig. 1 are replaced by gears 48a and 70a with a selective clutch connection C8 between these gears and the countershaft 16. The clutch C1 is for first and second speeds through the gears 20 and 22 while C7 is for direct speed.

In explaining Fig. 7 I have disregarded the range 1 and range 2 gearing 58—60 and 62—64 of Fig. 1 which could be provided or not as desired. The clutch C8 (and likewise the clutches C5 and C6 of Fig. 1) may be ratchet tooth type to prevent coasting or for easy engagement. They may be synchro-mesh type if desired. Synchromesh type would provide positive rather than ratchet clutch connections with the usual brakes on the revolving parts as provided in conventional synchro-mesh clutches and transmissions to brake the parts to the same speed to prevent "clashing" when shifting gears or clutches. The synchro-mesh type is illustrated for the clutch C8 in Fig. 7, the clutch teeth being of the square-jaw type rather than the ratchet type, and the clutch being provided with cone brakes 124 at each end to cooperate with mating cones 126 and 128 for the gears 48a and 70a. The cones 126 and 128 are slidably and non-rotatably pinned to the gears 48a and 70a as illustrated and are normally in the extended positions shown under the action of springs 130 behind them.

Also, in Fig. 7 I show clutch levers 132 and 134 for the respective clutches C1 and C7. Use of the clutch C1 is optional as if the shaft 12 is directly connected to a source of power, neutral, first speed, second speed and direct drive can be had by the use of C7 only. The operation of Fig. 7 secures first speed (when C8 is to the right) from 12 through C1, 20, 22, 28, 26, 16, C8, 70a and 68 to the output sleeve 14. For second speed, C8 is moved to the left whereupon the power from C1 goes through 20, 22, 28, 26, 16, C8, 48a, 46, the housing of C7 and 68 to the output sleeve 14. To secure direct drive, it is merely necessary to throw in the clutch C7 for clutching it to the input shaft 12, and the output sleeve 14 then rotates simultaneously with the shaft 12.

The form of my transmission shown in Figs. 8, 9 and 10 shows low speed and direct drive without free-wheeling prevention clutches. Friction clutches C9 and C10 are shown which are operated by a foot clutch lever 108 and a hand clutch lever 110 respectively. The housing for the transmission is shown at 10a, the input shaft at 12a and the output shaft at 14a. A gear 112 on a shaft 113 driven by the clutch C9 meshes with a gear 114 on a countershaft 120. A pinion 116 on the countershaft meshes with a gear 118 that drives the clutch C10. Interposed between the gear 114 and the countershaft 120 is an overrun clutch, the overrun rollers of which are indicated at 122.

As shown in Fig. 9, a plain gear 114a is substituted for the gear 114 of Fig. 8 and an overrun gear 116a for the plain gear 116 of Fig. 8. The overrun clutch 122 is then associated with the gear 116a. This arrangement produces substantially the same result as that shown in Fig. 8, and in Fig. 10 is another arrangement producing substantially the same result. In other words, the overrun clutch 122 can be interposed anywhere between the gear 112 and the clutch C10. In Fig. 10 it is shown associated with a gear 118a in place of the gear 118 instead of with either the gear 116a or 114 as in Figs. 9 and 8 respectively.

In the operation of the transmission shown in Fig. 8, assuming both clutches C9 and C10 disengaged, engagement of clutch C9 will operate the output shaft 14a at a reduced speed relative to the input shaft 12a by reason of the step-down gearing 112—114—116—118. When the clutch C10 is then thrown in, it will directly connect 14a to 113 so that they rotate as a unit and the overrun clutch 122 will then become operative to permit relative rotation of the gears without any driving effect because the higher speed of the gear 118 in direct drive causes overrunning of the countershaft 120 relative to the gear 114. Likewise in Figs. 9 and 10, the overrun clutch will operate similarly.

From the foregoing specification it is believed obvious that I have provided a transmission which accomplishes the objects contemplated. Changes may be made in the construction and arrangement of the parts thereof without departing from the real spirit and purpose of my invention. It is, therefore, my intention to cover by my claims any modified forms of structure or use of mechanical equivalents which may reasonably be included within their scope.

I claim as my invention:

1. In an automatic, multiple speed transmission of the character disclosed, an input shaft, an output shaft, a countershaft, first gear connections from said input shaft to said countershaft and second gear connections from said countershaft to said output shaft, a clutch connection between said input shaft and said first gear connections, an additional clutch connection between said first gear connections and said output shaft, an overrun clutch on said countershaft operable between said first gear connections and said countershaft, and means to control said clutch connections.

2. A multiple speed transmission of the character disclosed comprising an input shaft, an output shaft, a countershaft, low, middle and overdrive gear connections from said input shaft to said countershaft, a clutch for each of said low, middle and overdrive gear connections, a gear connection from said countershaft to said output shaft, a clutch for direct drive from said input shaft to said output shaft, interconnected means to control said clutches for said gear connections and said clutch for direct drive, and an overrun clutch included in each of said low, middle and overdrive gear connections to permit progressive up-shifting and down-shifting of said transmission without declutching said output shaft relative to said input shaft.

3. In a transmission of the character disclosed, an input shaft, an output shaft, a countershaft, low, middle and overdrive gear connections from said input shaft to said countershaft, a clutch for each of said low, middle and overdrive gear connections, a clutch for direct drive from said input shaft to said output shaft, interconnected means to progressively engage said clutches for said low, middle and overdrive gear connections and said clutch for direct drive, and an overrun clutch included in each of said low, middle and overdrive gear connections to provide constant application of power from said input shaft to said output shaft during up-shifting and down-shifting of said transmission.

4. In an automatic transmission of the character disclosed, an input shaft, an output shaft, a countershaft, low, middle and overdrive gear connections from said input shaft to said countershaft, a clutch for each of said low, middle and overdrive gear connections, a clutch for direct drive from said input shaft to said output shaft, means to control said clutches for said low, middle and overdrive gear connections and said clutch for direct drive, an overrun clutch included in each of said low, middle and overdrive gear connections to permit progressive up-shifting and down-shifting of said transmission, a plurality of gear connections between said countershaft and said output shaft, and means for shifting said last gear connections to different ranges of relative speeds in the same direction between said two shafts.

5. A transmission comprising an input shaft, an output shaft, a countershaft, low, middle and overdrive gear connections from said input shaft to said countershaft, a clutch for each of said low, middle and overdrive gear connections, a clutch for direct drive from said input shaft to said output shaft, an overrun clutch included in each of said low, middle and overdrive gear connections to permit progressive up-shifting and down-shifting of said transmission without declutching said output shaft relative to said input shaft, and two ranges of gear connections between said countershaft and said output shaft, both of said ranges being in the same direction.

6. A transmission comprising an input shaft, an output shaft, a countershaft, low, middle and overdrive gear connections from said input shaft to said countershaft, a clutch for each of said low, middle and overdrive gear connections, a clutch for direct drive from said input shaft to said output shaft, means to control said clutches for said low, middle and overdrive gear connections and said clutch for direct drive, a plurality of gear connections between said countershaft and said output shaft, and means for shifting said last gear connections to different ranges of forward speeds of said output shaft relative to said countershaft.

7. A transmission comprising an input shaft, an output shaft, a countershaft, low, middle and overdrive gear connections from said input shaft to said countershaft, a clutch for each of said low, middle and overdrive gear connections, a clutch for direct drive from said input shaft to said output shaft, an overrun clutch included in each of said low, middle and overdrive gear connections, a reverse gear connection between said input shaft and said countershaft, and interconnected means operable to selectively render one of said low, middle and overdrive gear connections inoperative and said reverse gear connection operative or vice versa.

8. In a transmission of the character disclosed, an input shaft, an output shaft, a countershaft, a gear connection from said input shaft to said countershaft, a clutch for said gear connection, a clutch for direct drive from said first clutch to said output shaft, means to control said clutch for said gear connection and said clutch for direct drive, an overrun clutch between said first clutch and said gear connection, a reverse gear connection between said input shaft and said countershaft, and interconnected means operable to selectively render said first gear connection inoperative and said reverse gear connection operative or vice versa.

9. In an automatic, multiple speed transmission of the character disclosed, an input shaft, an output shaft, a countershaft, low, middle and overdrive gear connections from said input shaft to said countershaft, a clutch for each of said low, middle and overdrive gear connections, a clutch for direct drive from said input shaft to said output shaft, an overrun clutch included in each of said low, middle and overdrive gear connections to permit progressive up-shifting and down-shifting of said transmission without declutching said output shaft relative to said input shaft, and a free-wheeling prevention clutch included in each of said low, middle and overdrive gear connections.

10. An automatic, multiple speed transmission of the character disclosed comprising an input shaft, an output shaft, a countershaft, low, middle and overdrive gear connections from said input shaft to said countershaft, a clutch for each of said low, middle and overdrive gear connections, a clutch for direct drive from said input shaft to said output shaft, means to control said clutches for said low, middle and overdrive gear connections and said clutch for direct drive, an overrun clutch included in each of said low, middle and overdrive gear connections, a free-wheeling prevention clutch included in each of said low, middle and overdrive gear connections, said interconnected means to control said clutches for said low, middle and overdrive gear connections and said clutch for direct drive, said interconnected means also controlling said free-wheeling prevention clutches to render them progressively inoperative during up-shifting of said transmission.

11. An automatic, multiple speed transmission of the character disclosed comprising an input shaft, an output shaft, a countershaft, low, middle and overdrive gear connections from said input shaft to said countershaft, a clutch for each of said low, middle and overdrive gear connections, a clutch for direct drive from said input shaft to said output shaft, means to control said clutches for said low, middle and overdrive gear connections and said clutch for direct drive, an overrun clutch included in each of said low, middle and overdrive gear connections, a free-wheeling prevention clutch included in each of said low, middle and overdrive gear connections, said means to control said clutches for said gear connections and said clutch for direct drive also controlling said free-wheeling prevention clutches to render them progressively inoperative during up-shifting of said transmission and to selectively render all of said free-wheeling clutches inoperative.

12. In a transmission of the character disclosed, an input shaft, an output shaft, a countershaft, low, middle and overdrive gear connections from said input shaft to said countershaft, a clutch for each of said gear connections, a clutch for direct drive from said input shaft to said output shaft, means to control said clutches for said low, middle and overdrive gear connections and said clutch for direct drive, an overrun clutch included in each of said low, middle and overdrive gear connections to permit progressive up-shifting and down-shifting of said transmission without declutching said output shaft relative to said input shaft, a plurality of gear connections between said countershaft and said output shaft, means for shifting said last gear connections to different ranges of relative speeds in the same direction between said two shafts, a free-wheeling prevention clutch included in each of said low, middle and overdrive plurality of gear connections, said means to control said clutches for said low, middle and overdrive gear connections and said clutch for direct drive also controlling said free-wheeling prevention clutches to render them progressively inoperative during up-shifting of said transmission and to selectively render all of said free-wheeling clutches inoperative.

13. In a power transmission of the character disclosed, an input shaft, an output shaft, a countershaft, low, middle and overdrive gear connections from said input shaft to said countershaft, a clutch for each of said low, middle and overdrive gear connections, a clutch for direct drive from said input shaft to said output shaft, means to control said clutches for said gear connections and said clutch for direct drive, an overrun clutch included in each of said low, middle and overdrive gear connections to permit progressive up-shifting and down-shifting of said transmission without declutching said output shaft relative to said input shaft, a plurality of gear connections between said countershaft and said output shaft, means for shifting said last gear connections to different ranges of relative speeds in the same direction, and a free-wheeling prevention clutch included in each of said low, middle and overdrive gear connections, said means to control said clutches for said low, middle and overdrive gear connections and said clutch for direct drive also controlling said free-wheeling prevention clutches to render them progressively inoperative during up-shifting of said transmission.

14. In a power transmission of the character disclosed, an input shaft, an output shaft, a countershaft, low, middle and overdrive gear connections from said input shaft to said countershaft, a clutch for each of said low, middle and overdrive gear connections, a clutch for direct drive from said input shaft to said output shaft, means to control said clutches for said gear connections and said clutch for direct drive, a plurality of gear connections between said countershaft and said output shaft, means for shifting said last gear connections to different ranges of relative speeds in the same direction, and a free-wheeling prevention clutch included in each of said first connections, said means to control said clutches for said low, middle and overdrive gear connections and said clutch for direct drive also controlling said free-wheeling prevention clutches to render them progressively inoperative during up-shifting of said transmission.

15. In a transmission of the character disclosed, an input shaft, an output shaft, a countershaft, low, middle and overdrive gear connections from said input shaft to said countershaft, a clutch for each of said low, middle and overdrive gear connections, means to control said clutches for said low, middle and overdrive gear connections, an overrun clutch included in each of said low, middle and overdrive gear connections to permit progressive up-shifting and down-shifting of said transmission without declutching, a reverse gear connection between said input shaft and said countershaft, and interconnected means operable to selectively render one of said low, middle and overdrive gear connections inoperative and said reverse gear connection operative or vice versa.

16. In a transmission of the character disclosed, an input shaft, an output shaft, a countershaft, low, middle and overdrive gear connections from said input shaft to said countershaft, a clutch for each of said low, middle and overdrive gear connections, means to control said clutches for said low, middle and overdrive gear connections, an overrun clutch included in each of said low, middle and overdrive gear connections to permit progressive up-shifting and down-shifting of said transmission without declutching, a plurality of gear connections between said countershaft and said output shaft, means for shifting said last gear connections to different ranges of relative speeds in the same direction between said two shafts, a reverse gear connection between said input shaft and said countershaft, and means operable to selectively render one of said low, middle and overdrive gear connections inoperative and said reverse gear connection operative or vice versa.

References Cited in the file of this patent

UNITED STATES PATENTS

| | | |
|---|---|---|
| 2,394,580 | Banker | Feb. 12, 1946 |
| 2,466,318 | Kohr | Apr. 5, 1949 |